(12) United States Patent
Nogima et al.

(10) Patent No.: US 11,151,332 B2
(45) Date of Patent: Oct. 19, 2021

(54) DIALOG BASED SPEECH RECOGNITION

(71) Applicant: International Business Machines Corporation, Armonk, NY (US)

(72) Inventors: Julio Nogima, São Paulo (BR); Marcelo C. Grave, São Paulo (BR); Claudio S. Pinhanez, São Paulo (BR)

(73) Assignee: International Business Machines Business, Armonk, NY (US)

( * ) Notice: Subject to any disclaimer, the term of this patent is extended or adjusted under 35 U.S.C. 154(b) by 288 days.

(21) Appl. No.: 16/295,667

(22) Filed: Mar. 7, 2019

(65) Prior Publication Data

US 2020/0285699 A1 Sep. 10, 2020

(51) Int. Cl.
*G06F 40/35* (2020.01)
*G10L 15/06* (2013.01)
*G10L 15/19* (2013.01)

(52) U.S. Cl.
CPC ............ *G06F 40/35* (2020.01); *G10L 15/063* (2013.01); *G10L 15/19* (2013.01)

(58) Field of Classification Search
CPC ........ G06F 40/35; G10L 15/063; G10L 15/19
See application file for complete search history.

(56) References Cited

U.S. PATENT DOCUMENTS

| | | | |
|---|---|---|---|
| 6,999,931 B2 | 2/2006 | Zhou | |
| 7,853,449 B2 | 12/2010 | Dharanipragada et al. | |
| 9,401,143 B2 | 7/2016 | Senior et al. | |
| 9,437,189 B2 | 9/2016 | Epstein et al. | |
| 9,978,367 B2 | 5/2018 | Aleksic et al. | |
| 2003/0149561 A1* | 8/2003 | Zhou | G10L 15/26 704/240 |
| 2008/0091412 A1* | 4/2008 | Strope | G10L 15/197 704/10 |
| 2008/0091435 A1* | 4/2008 | Strope | 704/277 |
| 2008/0091443 A1* | 4/2008 | Strope | G06Q 30/02 705/301 |
| 2012/0191449 A1* | 7/2012 | Lloyd | H04M 1/6075 704/231 |
| 2018/0336896 A1* | 11/2018 | McGann | G06N 5/003 |

OTHER PUBLICATIONS

Cuesta, On the dynamic adaptation of language models based on dialogue information, Expertsystem with Applications, 2012, 1069-1085 (Year: 2012).*

Frank Wessel, and Andrea Baader, "Robust dialogue-state dependent language modeling using leaving-one-out," 1999 IEEE International Conference on, vol. 2, pp. 741-744. IEEE, 1999.

(Continued)

*Primary Examiner* — Sonia L Gay
(74) *Attorney, Agent, or Firm* — Patterson + Sheridan, LLP

(57) ABSTRACT

Embodiments provide for dialog based speech recognition by clustering a plurality of nodes comprising a dialog tree into at least a first cluster and a second cluster; creating a first dataset of natural language sentences for the first cluster and a second dataset of natural language sentences for the second cluster; generating a first specialized language model (LM) associated with the first cluster based on the first dataset; and generating a second specialized LM associated with the second cluster based on the second dataset, wherein the first specialized LM is different from the second specialized LM.

15 Claims, 8 Drawing Sheets

(56) References Cited

OTHER PUBLICATIONS

Wei Xu, and Alex Rudnicky, "Language modeling for dialog system" Sixth International Conference on Spoken Language Processing. 2000.

Karthik Visweswariah, and Harry Printz, "Language models conditioned on dialog state," Seventh European Conference on Speech Communication and Technology. 2001.

\* cited by examiner

US 11,151,332 B2

DIALOG BASED SPEECH RECOGNITION

BACKGROUND

The present invention relates to Natural Language Processing (NLP) systems, and more specifically, to conversational and dialog management. End users may interact with NLP systems via textual or spoken-language agents, often referred to as chatbots. With spoken language chatbots, a speech recognition component transcribes the spoken language utterances from a person into text, which are processed by the NLP system to determine a conversational intent of the utterances. Based on the determined conversational intent, the NLP system responds to the person with an answer to a query, a request for additional information, or the like. A person may thus converse with the chatbot using the language patterns employed by humans, rather than submitting machine-formatted queries to a database, and the NLP system may respond in kind over several rounds of conversation until the person (or the NLP system) ends a dialog.

SUMMARY

According to one embodiment of the present invention, a method for dialog based speech recognition is provided, the method including: clustering a plurality of nodes comprising a dialog tree into at least a first cluster and a second cluster; creating a first dataset of natural language sentences for the first cluster and a second dataset of natural language sentences for the second cluster; generating a first specialized language model (LM) associated with the first cluster based on the first dataset; and generating a second specialized LM associated with the second cluster based on the second dataset, wherein the first specialized LM is different from the second specialized LM.

According to one embodiment of the present invention, a system for dialog based speech recognition is provided, the system including: a navigation tracker, configured to identify a current node in a dialog tree and select a specialized LM associated with the current node; a speech-to-text converter configured to receive utterances of natural language speech and convert the utterances into text based on the specialized LM selected for the current node; and a dialog service configured to navigate between the current node and a subsequent node in the dialog tree based on the text, wherein navigating to the subsequent node signals the navigation tracker to identity the subsequent node in the dialog tree and select a new specialized LM associated with the subsequent node for the speech-to-text converter to use when converting a subsequent utterance into text.

According to one embodiment of the present invention, a computer readable storage medium including instructions for dialog based speech recognition that when performed by a processor enable the processor to perform an operation comprising: clustering a plurality of nodes comprising a dialog tree into at least a first cluster and a second cluster; creating a first dataset of natural language sentences for the first cluster and a second dataset of natural language sentences for the second cluster; generating a first specialized language model (LM) associated with the first cluster based on the first dataset; and generating a second specialized LM associated with the second cluster based on the second dataset, wherein the first specialized LM is different from the second specialized LM.

DETAILED DESCRIPTION

Figure 1:
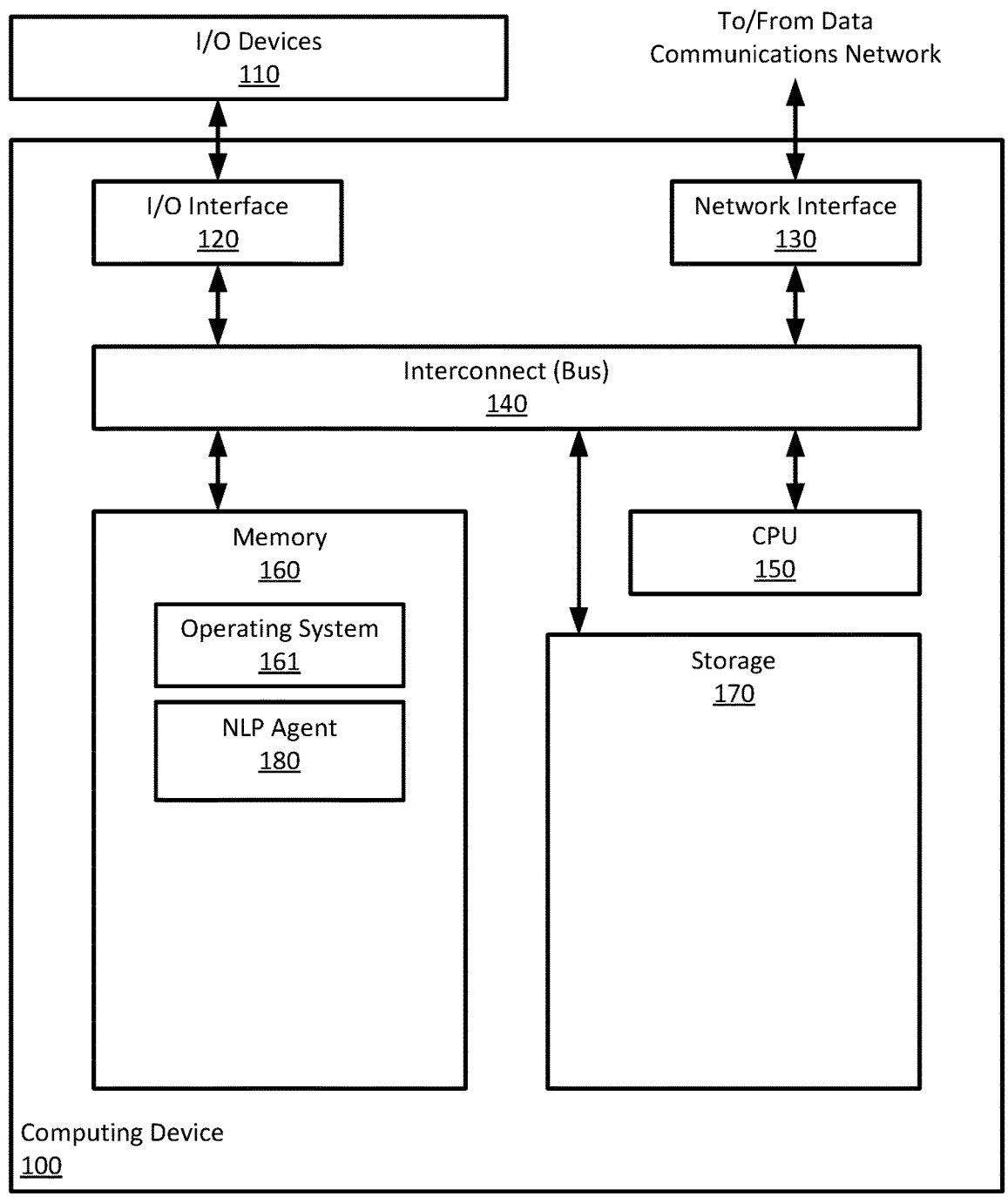
FIG. 1 illustrates a computing system, according to embodiments of the present disclosure.

In a Natural Language Processing (NLP) system, due to the vagaries of human language, one utterance may map to several different intents. For example, a chatbot for a utility service that is provided with the text of an utterance of "I want to turn on the water" may respond to a human user with instructions for how to set up a utility account (a first intent). That same chatbot when provided with the text of an utterance of "I want to turn off the water" may respond with instructions for how to deactivate a utility account (a second intent) or how to temporarily cutoff a water supply for maintenance purposes (a third intent). Similarly, several different utterances may map to one intent. For example, a chatbot for a utility may determine that the intent (e.g., to deactivate a utility account) of a first utterance of "I am moving to a new house" is the same intent specified in a second utterance of "I need to terminate services".

When using spoken utterances as input, an NLP system first converts the spoken utterances to text, and the accuracy of the speech-to-text conversion cascades to affect how well the NLP system determines the user's intent. The differences in pronunciation, sentence construction, and natural variations in rhythm of speech can all affect how the spoken utterances are transcribed into text. To help improve the accuracy of speech-to-text conversion, a developer may assign different Language Models (LM) to speech converters that are used in different domains, where the different LMs use different vocabulary sets to identify words relevant to that particular domain. For example, an NLP system related to the domain of automotive maintenance may include different vocabulary in an LM than an NLP system related to the domain of hotel and airline reservations.

An LM is a statistical model that captures the probability of occurrence of words and word sequences. These statistics are captured from the data set used to train a particular language model. The LM provides information on contextual relationships between words, and helps disambiguate word sequences that sound acoustically similar (e.g., "recognize speech" versus "wreck a nice beach"). The probability that a given set of phonemes are related to one word in a spoken sentence is used to identify the other words spoken in the same sentence. Stated differently, an LM is used to analyze the entirety of the spoken sentence to identify not only the most likely individual words in that sentence, but the most likely valid sentence that may be constructed from those words. For example, the sentence of "half a dozen pens" and "have a doesn't pins" may be pronounced identically (in some accents of English), but a speech recognizer employing an LM may identify the first sentence as more likely to be valid than the second sentence based on the first sentence including a set of words that form a more likely context for a valid sentence, whereas the second sentence, while including valid word-to-word conversions, forms a less likely context for a valid sentence (e.g., is more likely a nonsensical grouping of otherwise valid words). However, as the vocabulary in a given LM grows, so too do the chances that a speech converter using that LM incorrectly maps a given word or sequence of words in an utterance to text. If, however, the vocabulary of the given LM omits the user's intended word, the speech converter has no chance to correctly map a given word or sequence of words in an utterance to text.

For example, if the user is seeking to order six pens—but has an accent that uses the same phonemes for "pens" and "pins," and the LM used by the speech converter includes both the word "pens" and "pins," the speech converter may correctly/incorrectly determine that the user is variably seeking to order "half a dozen pens" or "half a dozen pins." Continuing the example, if the LM instead excludes the word "pins," the speech converter would correctly determine that the user is seeking to order "half a dozen pens" and would not have the option to incorrectly identify that the user is seeking to order "half a dozen pins". In contrast, if the LM instead excludes the word "pens," the speech converter would incorrectly determine that the user is seeking to order "half a dozen pins" and would not have the option to correctly identify that the user is seeking to order "half a dozen pens." Accordingly, an LM may be tuned for a particular domain or environment to improve the accuracy at which speech is converted to text (e.g., the LM for an livestock domain may include "pens" and exclude "pins" whereas the LM for a bowling supply domain may exclude "pens" and include "pins"). However, some domain-specific LMs may still include ambiguities after tuning (e.g., an LM for an office supply domain may need to include both the term "pen" and the term "pin") and require additional confirmation/clarification from users to distinguish such words (e.g., "did you mean 'ink pens' or 'stick pins'"), which requires additional computing resources to handle, and may frustrate end-users of such NLP systems.

The present disclosure provides for improvements in NLP systems that use speech-to-text conversion by tuning LMs to particular dialog nodes for a conversation within a domain. As a human user conversationally navigates a dialog with an NLP agent (e.g., a chatbot), the NLP agent generates, organizes, and selects a specialized LM for various branches of the dialog tree that the NLP agent manages. For example, when a user initiates a conversation with the NLP agent, the NLP agent uses a first LM to determine a first intent of the human user, but as the conversation progresses, the NLP agent selects second and subsequent LMs that are specialized to the individual portions of the dialog tree. The NLP agent monitors several conversations to determine if the selected LMs provide for accurate conversions of speech-to-text, and may cluster several nodes together to use a shared specialized LM, adjust which nodes use a particular specialized LM, develop new specialized LMs for use with particular nodes, update the vocabulary lists of existing specialized LMs, etc.

The specialized LMs may be designated portions or subsets of a generalized LM for a particular domain (e.g., a domain LM). By including less vocabulary in a specialized LM than the domain LM, and switching between various specialized LMs at various points in a conversation, an NLP agent may have access to the large vocabulary set offered by the domain LM, but is enabled to distinguish between similar sounding utterances with the greater accuracy offered by the smaller vocabulary sets of the specialized LMs. Additionally, specialized LMs provided for savings in processing and storage resources when mapping utterances to text, among other benefits.

FIG. 1 illustrates a computing system 100, which may be a personal computer, a laptop, a tablet, a smartphone, etc. As shown, the computing system 100 includes, without limitation, a central processing unit (CPU) 150, a network interface 130, an interconnect 140, a memory 160, and storage 170. The computing system 100 may also include an I/O device interface 120 connecting I/O devices 110 (e.g., keyboard, display and mouse devices) to the computing system 100.

The CPU 150 retrieves and executes programming instructions stored in the memory 160. Similarly, the CPU 150 stores and retrieves application data residing in the memory 160. The interconnect 140 facilitates transmission, such as of programming instructions and application data, between the CPU 150, I/O device interface 120, storage 170, network interface 140, and memory 160. CPU 150 is included to be representative of a single CPU, multiple CPUs, a single CPU having multiple processing cores, and the like. And the memory 160 is generally included to be representative of a random access memory. The storage 170 may be a disk drive storage device. Although shown as a single unit, the storage 170 may be a combination of fixed and/or removable storage devices, such as magnetic disk drives, flash drives, removable memory cards or optical storage, network attached storage (NAS), or a storage area-network (SAN). The storage 170 may include both local storage devices and remote storage devices accessible via the network interface 130.

Further, computing system 100 is included to be representative of a physical computing system as well as virtual machine instances hosted on a set of underlying physical computing systems. Further still, although shown as a single computing system, one of ordinary skill in the art will recognized that the components of the computing system 100 shown in FIG. 1 may be distributed across multiple computing systems connected by a data communications network.

As shown, the memory 160 includes an operating system 161 (e.g., Microsoft's WINDOWS® Operating System) and an NLP agent 180. The NLP agent 180 may provide one or more of the services discussed in greater detail in relation to FIGS. 2 and 3 and perform one or more of the methods 500 and 600 (and portions thereof) discussed in relation to FIGS. 5 and 6. In some embodiments, portions of the NLP agent 180 may be distributed among several computing devices.

Figure 2:
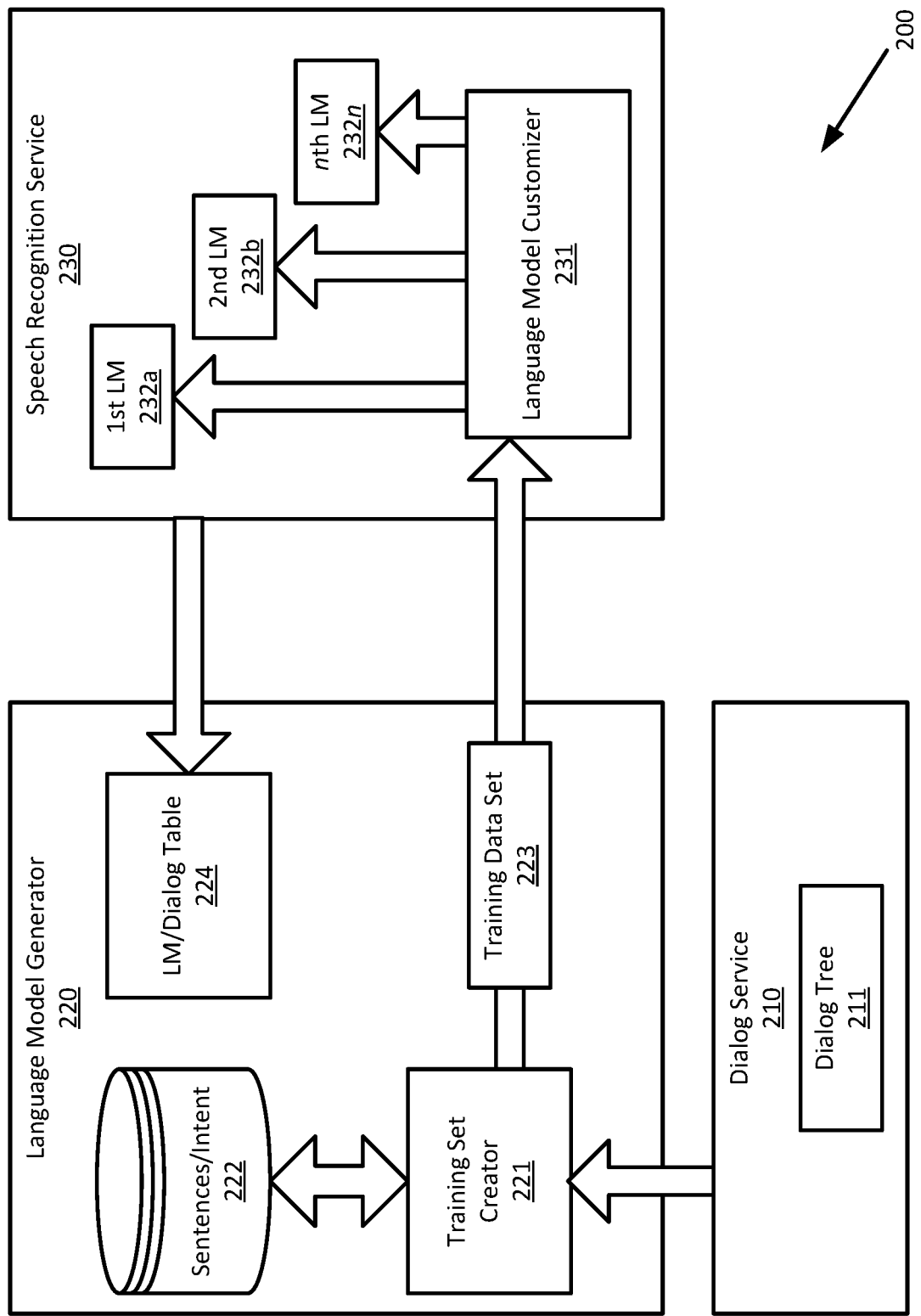
FIG. 2 illustrates a computing environment for customizing Language Models to a dialog, according to embodiments of the present disclosure.

FIG. 2 illustrates a computing environment 200 for customizing LMs to a dialog. Within the computing environment 200, a dialog service 210 provides human end-users with the ability to navigate a dialog tree 211 using natural language queries and statements. The dialog service 210 may be part of an NLP agent 180, such as a chatbot, automated telephone menu system, or the like. The dialog tree 211 defines different pathways between nodes related to various intents within a conversation. As the dialog service 210 receives natural language sentences, the dialog service 210 moves between various nodes within the dialog tree 211 to request additional information from a human user, provide information to a human user, and/or provide information to an institutional user. For example, a person may submit a natural language sentence of "I need to reset my password", which the dialog service 210 uses to navigate to a node in the dialog tree 211 related to an intent for password resets. While present at the node related to password resets, the dialog service 210 may request additional information from the requestor (e.g., "would you like to authenticate via text message?"), provide information to the requestor (e.g., "your temporary password is: 12345"), and provided information to an outside system (e.g., a password reset request to the hosting system).

A language model generator 220 receives operational data from the dialog service 210 that include the sentences received from end-users and the intents/nodes that the sentences were associated with by the dialog service 210. A training set creator 221 receives the operational sentences from the dialog service 210 and sentences designated as intent training sentences by an operator or administrator of the dialog service 210, and stores the paired sentences and intents in a sentences/intents database 222. The training set creator 221 access the sentences/intents database 222 to produce a training data set 223 of various natural language sentences. In some embodiments, the sentences that are stored in association with an intent in the sentences/intents database 222 are augmented to increase the number of sentences available to train the dialog service 210 and/or the language model customizer 231. In yet another embodiment the training data set 223 may be created through Natural Language Generator (NLG) tools by generating automatically sentences similar to the training sentences of the dialog service 210.

The training data set 223 may be used to train the dialog service 210 to navigate the dialog tree 211 using various machine learning models to identify the intent of a natural language sentence, and is also provided to the speech recognition service 230 to customize several LMs 232a-n (generally, LM 232) for use in conjunction with the dialog tree 211. Each of the LMs 232 customized by the language model customizer 231 are associated with at least one node (or a cluster of several nodes) in the dialog tree 211, and the associations between the node(s) and a given LM 232 are stored in an LM/dialog table 224

In some embodiments, the language model customizer 231 produces several LMs 232 by including the vocabulary found in the training data set 223 for each cluster of intents/dialog nodes into an associated specialized LM 232; any vocabulary not found in the training data set 223 that is found in a domain-specific LM 232 may be omitted from the collective specialized LMs 232. In other embodiments, the language model customizer 231 sorts all of the vocabulary in a domain specific LM 232 into at least one specialized LM 232 based on the vocabulary included in the training data set 223 that is associated with each cluster. In some embodiments, the language model customizer 231 retains the domain-specific LM 232 as a first LM 232a that is associated with any dialog node or intent that is not otherwise associated with a specialized LM 232.

A specialized LM 232 includes a vocabulary list of words that are determined to be useful within a portion of a dialog tree 211. For example, a first LM 232a may include a word that is not included in the second LM 232b, and the second LM 232b may include a word that is not included in the first LM 232a. In another example, two specialized LMs 232 that are different from each other may include the same sets of words, but at different probabilities of use or in different sequences. For example, a first LM 232a and a second LM 232b may each include a given word in the respective vocabularies, but may interpret an utterance differently as including or excluding that given word based on the probability associated with the given word in the individual LM 232 and the other words identified in the utterance by the individual LM 232. By including different vocabulary, or probabilities of use of that vocabulary, a collection of specialized LMs 232 may be smaller in total size than a generalized domain-specific LM 232, and require fewer processing resources to navigate when identifying a word that is indicated in human speech.

As additional training data sets 223 are received in successive rounds of training, the language model customizer 231 may update the vocabulary of existing LMs 232 (adding or removing words), combine existing LMs 232 into a smaller number of LMs 232, separate existing LMs 232 into a greater number of LMs 232, and update which nodes/clusters a given LM 232 is associated with.

Figure 3:
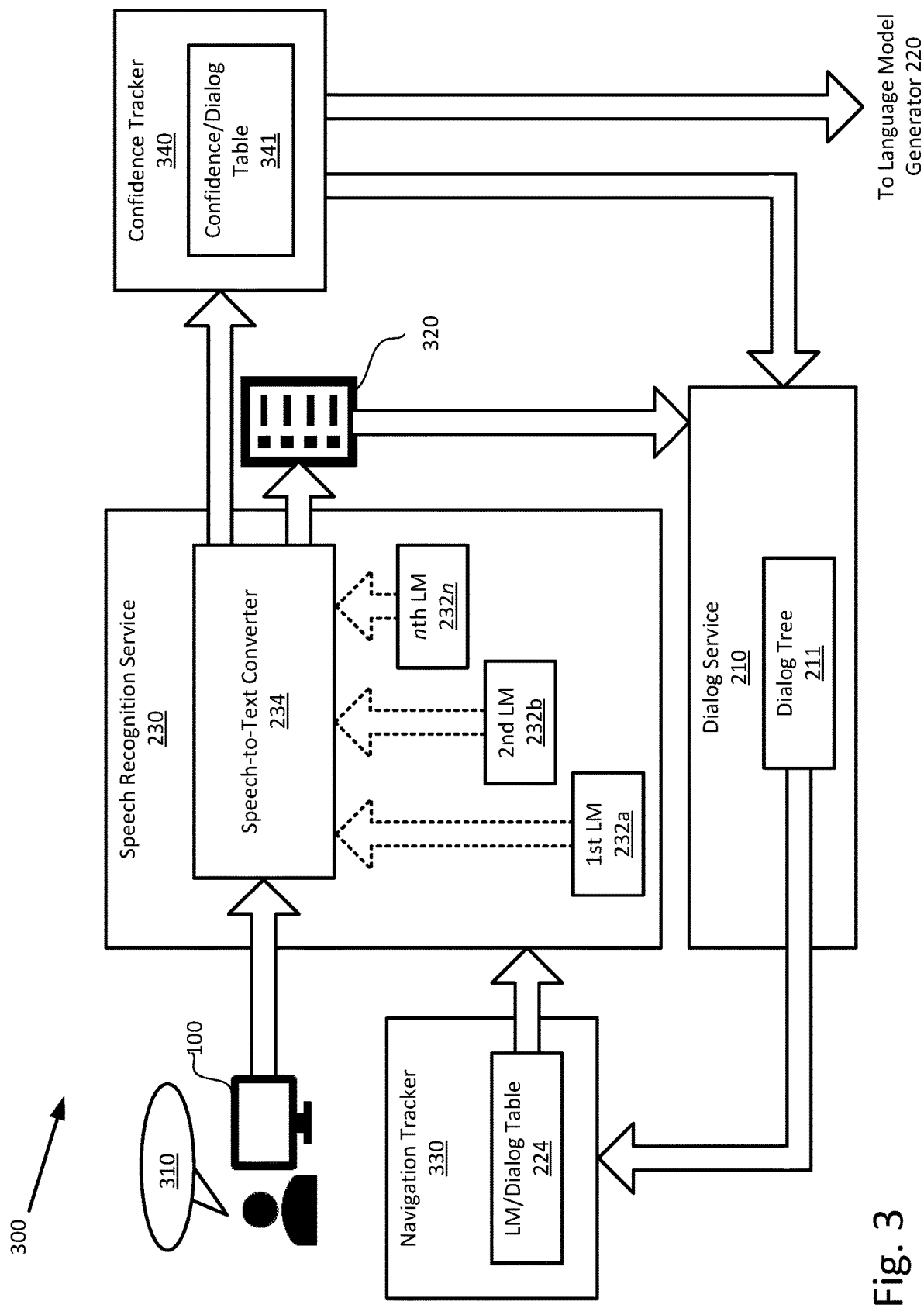
FIG. 3 illustrates a computing environment for navigating a dialog using specialized Language Models, according to embodiments of the present disclosure.

FIG. 3 illustrates a computing environment 300 for navigating a dialog using specialized LMs 232. When a user provides a natural language utterance 310 to a speech recognition service 230 (via a computing system 100), a speech-to-text converter 234 receives the individual sounds that make up the utterance 310 and converts those sounds (and the gaps/silences between sounds) into a text 320 representation of the utterance 310. The speech-to-text converter 234 uses various machine learning models in conjunction with a selected LM 232 (e.g., one of the first LM 232a through the nth LM 232n) to convert the audio information in the utterance 310 into individual words in the text 320.

By using a set of specialized LMs 232 rather than one generalized domain-specific LM 232, the speech-to-text converter 234 can produce a text 320 with greater fidelity to the original utterance 310, especially when handling phonemes with multiple useful mappings to words within the dialog tree 211, that are useful at specific points in the dialog tree 211 but are not useful at other points. The dialog service 210 therefore identifies the point in the dialog tree 211 that the user is located at to a navigation tracker 330. The navigation tracker 330 identifies the specialized LM 232 associated with that point in the dialog tree 211 from the LM/dialog table 224, and selects which LM 232a-232n that the speech-to-text converter 234 uses when converting the next utterance 310 from the end-user into text 320.

For example, consider a utility company that that handles water/sewer services and electrical services, and provides a dialog service 210 to end-users to inquire about account statuses, utility outages, and the like. The dialog tree 211 used by the dialog service 210 may include some nodes that are related to water/sewer services and other nodes that are related to electrical service. Although the dialog service 210 may receive utterances 310 related to water/sewer service that include the word "water", the dialog service 210 may also receive utterances 310 related to electrical service that include the word "Wattage." Although the words "water" and "Wattage" have several phonetic similarities, the intent of a natural language sentence using either word is likely different in the current context (e.g., to inquire about water/sewer service versus to enquire about electrical service). The speech-to-text converter 234 therefore needs to recognize both the term "water" and the term "wattage," but in different contexts.

The navigation tracker 330 recognizes the context that the user is in based on the current node in the dialog tree 211, and selects the specialized LM 232 associated with that context/intent. For example, a first specialized LM 232a that is associated with the context/intent of electrical service inquiries, and includes the word "Wattage" in the vocabulary list and excludes the word "water" from the vocabulary list. In this example, a second specialized LM 232b that is associated with the context/intent of water service inquiries may include the word "water" and exclude the word "Wattage" from a corresponding vocabulary list. When the navigation tracker 330 signals the speech-to-text converter 234 to use the first specialized LM 232a, an ambiguous utterance 310 of "water/wattage" is recognized as "wattage" as the first specialized LM 232a does not give the speech-to-text converter 234 the option to recognize the utterance 310 as including the word "water". In contrast, if the navigation tracker 330 signals the speech-to-text converter 234 to use the second specialized LM 232b to convert that same ambiguous utterance 310 of "water/wattage" to text 320, the speech-to-text converter 234 would recognize the utterance 310 as including the word "water" as the second specialized LM 232b does not give the speech-to-text converter 234 the option to recognize the utterance 310 as including the word "wattage". The navigation tracker 330 and the several LMs 232 thus allow the speech-to-text converter 234 to distinguish between ambiguous utterances 310 with greater fidelity to the intended meaning, and maintain a broad vocabulary for use in different contexts.

The speech-to-text converter 234 produces a text 320 based on the utterance 310, and selects words from the selected specialized LM 232 that have the greatest confidence in matching the phonemes in the utterance 310. A confidence tracker 340 monitors the confidences at which the speech-to-text converter 234 converts the utterances 310 into text 320, and tracks how confident the speech-to-text converter 234 is in the conversions at various portions of the dialog tree 211 via a confidence/dialog table 341. The confidence tracker 340 may indicate to the dialog service 210 the confidence of conversion of speech to text, so that the dialog service 210 can advance to a node in the dialog tree 211 requesting clarification (repeating the current node to re-request the utterance 310, moving to a "please repeat what you said" node, etc.). When the confidence of conversion for a given node or cluster falls below a predefined threshold, or the user indicates that a different navigation through the dialog tree 211 is desired, the confidence tracker 340 may signal the language model generator 220 to update the LMs 232 or the assignment of LMs 232 to various nodes in the dialog tree 211.

For example, if the average confidence of converting utterances 310 into text 320 at a given node across several conversions falls below a confidence threshold, the confidence tracker 340 may request that that the language model generator 220 update the LMs 232 or which LM 232 is associated with the given node. In another example, when the speech-to-text converter 234 has high confidence in the conversion of an utterance 310 to text 320, but the intent of the utterance 310 is to navigate backward in the dialog tree 211 (e.g., an utterance of "No, I do not want to know how many kilowatts I used. I want to know how much water I used." or "Return to menu!") the confidence tracker 340 may request that that the language model generator 220 update the LMs 232 or which LM 232 is associated with the given node.

Figure 4A:
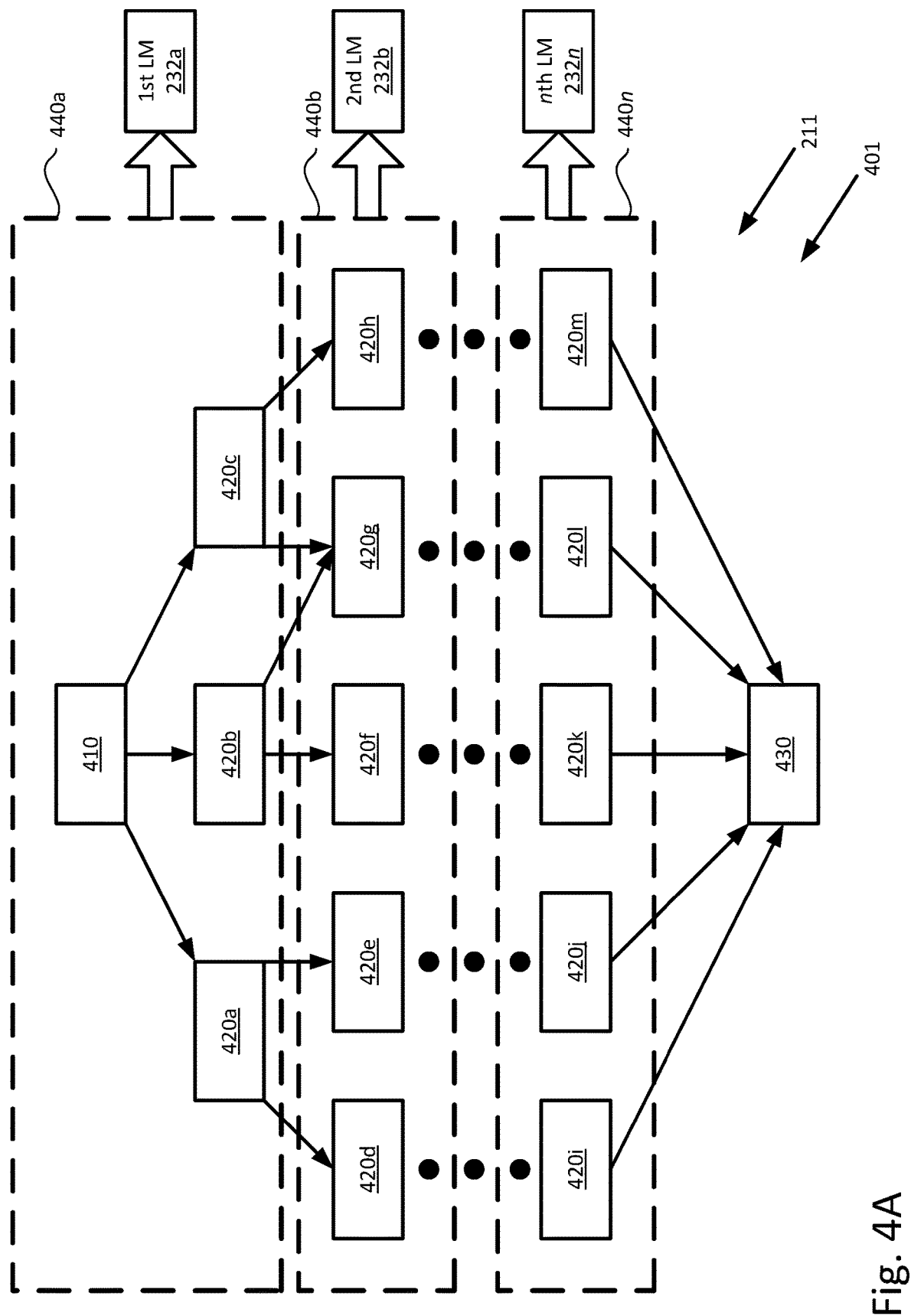
FIGS. 4A-4C illustrate associations between specialized Language Models and portions of a dialog tree, according to embodiments of the present disclosure.
Figure 4B:
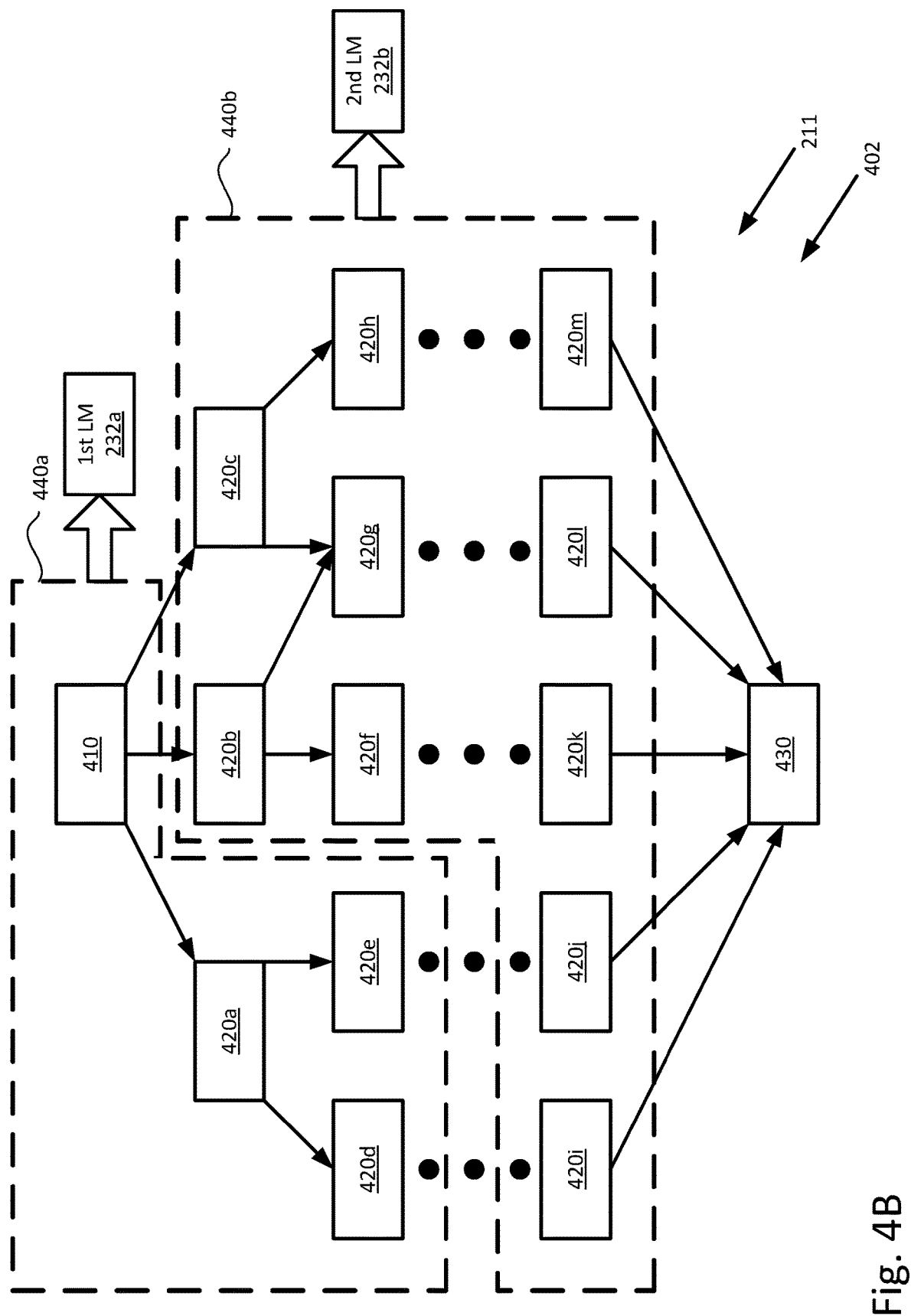
Figure 4C:
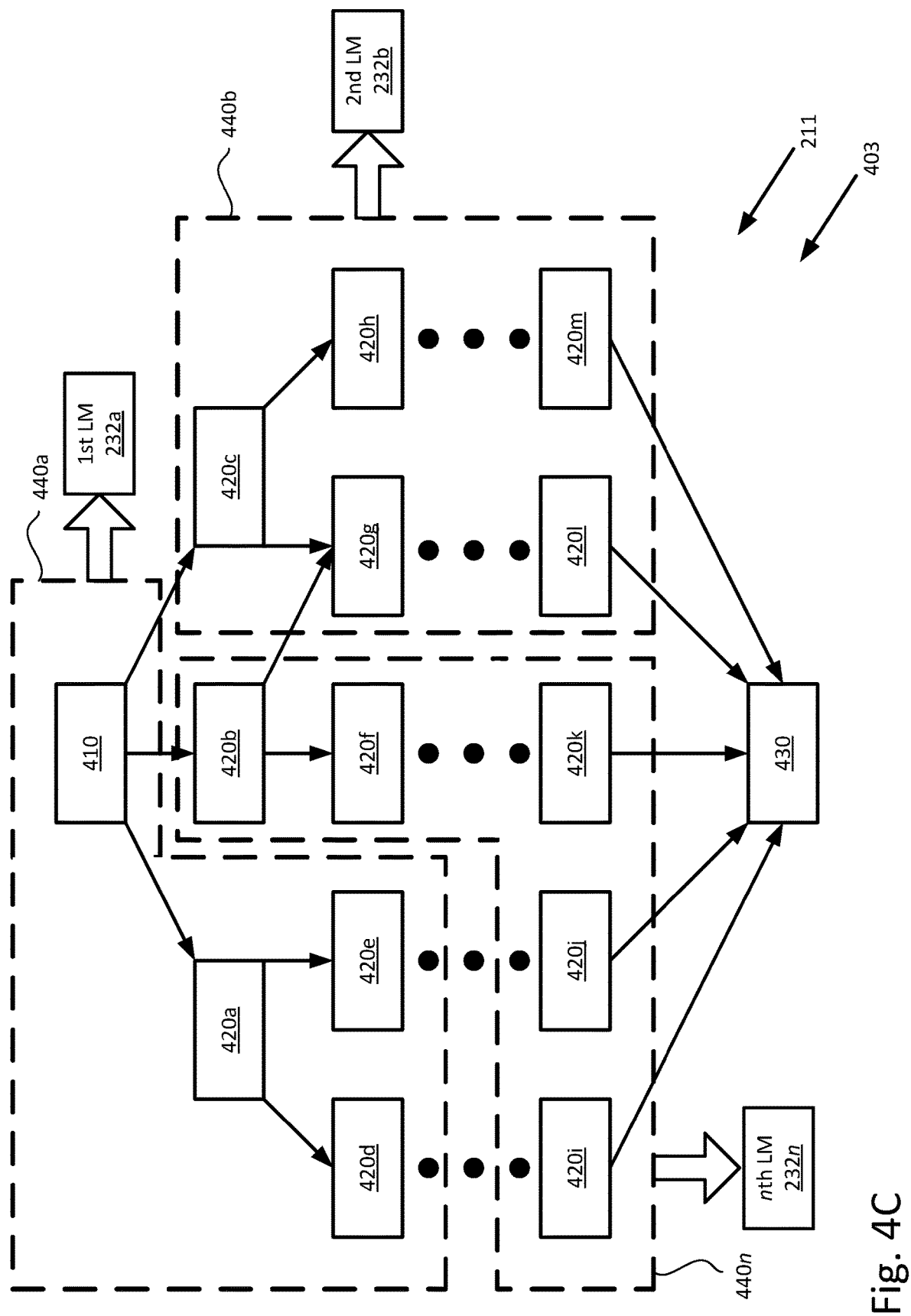

FIGS. 4A-4C illustrate associations between specialized LMs 232 and portions of a dialog tree 211. The dialog tree 211 illustrated in FIGS. 4A-4C includes an entry node 410, several intermediate nodes 420a-m (generally, intermediate node 420), and an exit node 430.

An entry node 410 corresponds to the node in the dialog tree 211 where the user enters a conversation. For example, an entry node 410 may request information from every user accessing a dialog service 210 (e.g., a welcome message, a language selection, user identification request).

The intermediate nodes 420 represent the branching choices in the dialog tree 211 that relate to various intents that the dialog service 210 is programmed or configured to address (e.g., identify account activity, change address/phone numbers to contact user, suspend/cancel/resume/start services, add/remove a user, receive user comments, walk through a troubleshooting method). Each intermediate node 420 may include instructions for the dialog service 210 to request additional information from a user to determine which node to advance to next in the course of a conversation (e.g., a question to transmit to the user based on the identity of the intermediate node 420 and/or previously received information from the user). Each intermediate node 420 may include instructions to query an external system for data requested by a user (e.g., the account activity) and to return an output to the user (e.g., "Your account activity for the last month is X kilowatt hours.") Each intermediate node 420 may include instructions to upload information received from the user to an external system (e.g., the name of a new user to add to an account). In various embodiments, a dialog tree 211 may include more or fewer nodes with various interconnections defined therebetween than those illustrated in FIGS. 4A-4C.

Once a final stage of a dialog branch is reached, the dialog tree 211 advances to an exit node 430. The exit node 430 may include a farewell message and may optionally terminate a conversation or direct the user back to the entry node 410 to start a new conversation. Because the exit node 430 does not request input from the user, the exit node 430 may be unassociated with an LM 232, or may be associated with a generalized domain-specific LM 232.

FIG. 4A illustrates a first association 401, as may be initially established for a dialog tree 211. A first cluster 440a (generally, cluster 440) includes the entry node 410, and three intermediate nodes 420a-c; a second cluster 440b includes five intermediate nodes 420d-h; and an nth cluster 440n includes five intermediate nodes 420i-m. The first cluster 440a is associated with a first LM 232a so that the speech-to-text converter 234 uses the first LM 232a when analyzing utterances 310 received from a user at nodes included in the first cluster 440a. The second through nth clusters 440b-n are similarly associated with corresponding second through nth LMs 232b-n.

FIG. 4B illustrates a second association 402, as may be established for a dialog tree 211 once flows through the dialog tree 211 are determined. A first cluster 440a associated with a first LM 232a includes the entry node 410 and three intermediate nodes 420a, 420d, and 420e. A second cluster 440b associated with a second LM 232b includes the remaining intermediate nodes 420b, 420c, and 420f-m. The first association 401 is a layered or hierarchical mapping of nodes to clusters 440 (and associated LMs 232). As will be appreciated, the terminology useful in a branching dialog may be differentiated not only based on hierarchies in the conversation, but by different flows through the conversation. For example, many conversations may begin with similar requests and responses, but will begin to differ in the terminology used as the conversation progresses. In the illustrated example, the second association 402 may differentiate the nodes of the first cluster 440a from those of the second cluster 440b based on different vocabulary used in the utterances 310 received from users when interacting with those respective nodes.

FIG. 4C illustrates a third association 403, as may be adjusted from the second association 402 as the conversational flows through the dialog tree 211 are refined. A first cluster 440a associated with a first LM 232a includes the entry node 410 and three intermediate nodes 420a, 420d, and 420e; a second cluster 440b associated with a second LM 232b includes intermediate nodes 420c, 420g, 420h, 420l, and 420m; and an nth cluster associated with nth LM 232n includes intermediate nodes 420b, 420f, and 420i-k. The nodes of the nth cluster 440n may be differentiated from those in the second cluster 440b based on a frequency of navigation between the nodes of each cluster 440, low confidence scores between the vocabulary used in each cluster 440, etc.

Figure 5:
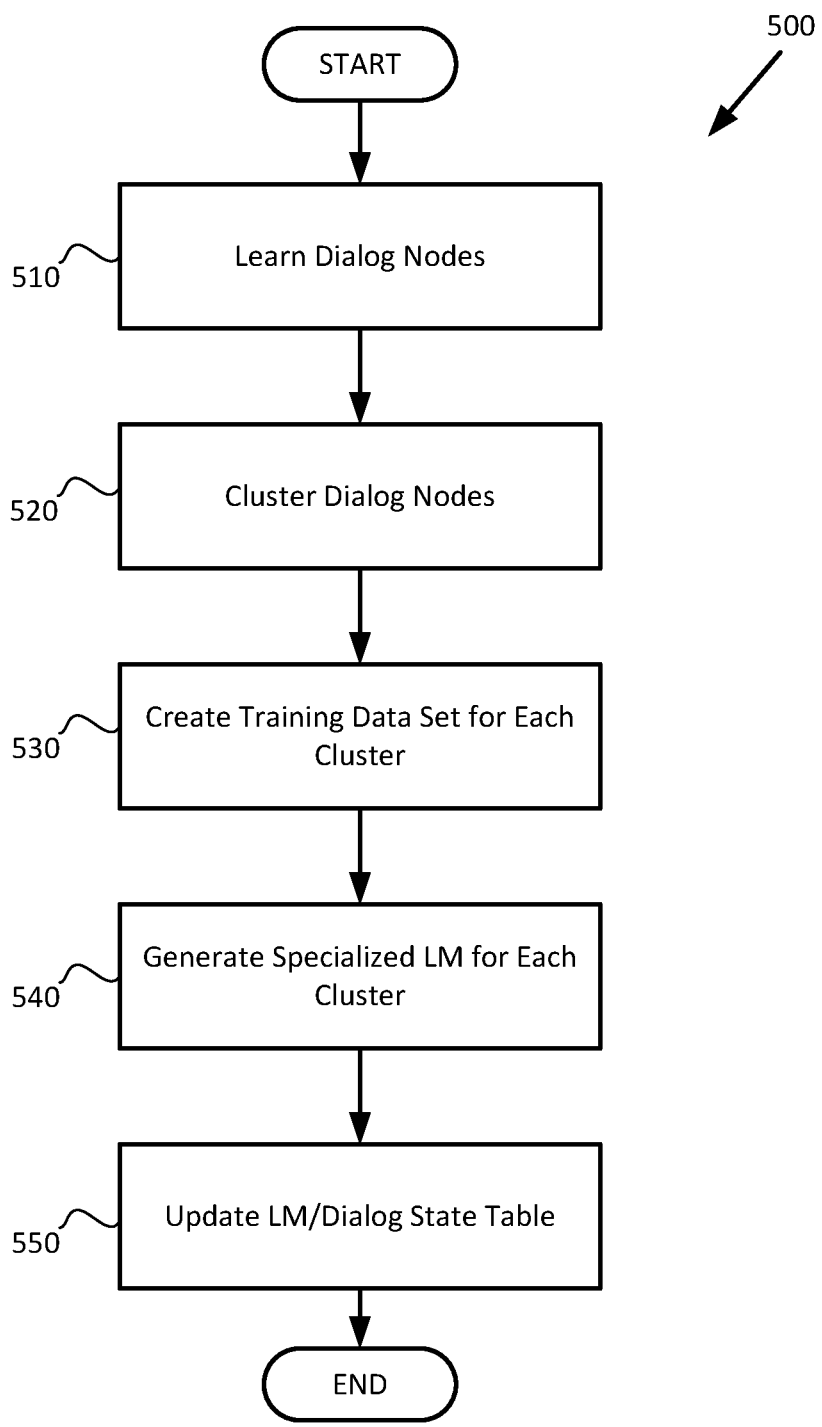
FIG. 5 is a flowchart of a method for customizing Language Models to a dialog, according to embodiments of the present disclosure.

FIG. 5 is a flowchart of a method 500 for customizing LMs 232 to a dialog. Method 500 begins at block 510, where a language model generator 220 learns of the nodes and relations between nodes for a dialog tree 211. At block 520, the language model generator 220 groups the various nodes in the dialog tree 211 into two or more clusters 440. The clusters 400 may be based on a shared hierarchy of the nodes within the dialog tree 211, observed conversational flows through the dialog tree 211, and/or similarities in vocabulary used through historic interactions between the users and the dialog tree 211. In some embodiments, the language model generator 220 uses a clustering algorithm than analyzes the shared vocabulary included in the sample sentences (e.g., from the sentence/intent database 222) for each node to group several nodes together into a cluster 440. In some embodiments, the language model generator 220 observes historic conversational flows through the dialog tree 211 (e.g., what percent of conversations proceed from a first node to a second node) and groups nodes together into clusters 440 based on how frequently a subset of the nodes are included in a historic conversational flows.

At block 530, the language model generator 220 creates training data sets 223 for each cluster 440 identified in the dialog tree 211. The training data sets 223 include the text of several natural language sentences that are associated with various intents and/or nodes in the dialog tree 211. In various embodiments, the training data sets 223 include historic sentences received from end-users, sentences designated by an operator or administrative user for use as training examples, and augmented versions of historically received/designated sentences that provide additional examples based on previously provided examples (e.g., negated versions of training examples, versions with more/fewer filler words, versions with reversed clauses). In various embodiments, the training data sets 223 generated at block 520 include the sentences and matched intents that are used to train a machine learning model in the dialog service 210 to navigate to different nodes within the dialog tree 211.

At block 540, the speech recognition service 230 receives the training data sets 223 and generates a specialized LM 232 for each cluster 440 of the dialog tree 211. In various embodiments, the speech recognition service 230 includes all of the words identified in the training data sets 223 in the LM 232 for the associated cluster 440. In some embodiments, the speech recognition service 230 includes words in addition to those included in the training data sets 223 within the LMs 232. In some embodiments, the speech recognition service 230 uses a prior version of the LM 232 as a basis for the vocabulary to include in a newly generated LM 232. For example, when a prior LM 232 is updated, the speech recognition service 230 may identify new words to add or remove from an existing vocabulary of the prior LM 232 to generate the new LM 232. Once generated, the LMs 232 may be deployed to the speech recognition service 230 (e.g., moved to an active directory of a cloud-based service, uploaded to a computing system 100 of a localized service).

At block 550, the speech recognition service 230 updates the LM/dialog table 224 to identify which LMs 232 are to be selected when an end-user navigates to a given node within the dialog tree 211. In various embodiments, the LM/dialog table 224 is deployed to a language model generator 220, a navigation tracker 330, or another component of an NLP agent 180. Method 500 may then conclude.

Figure 6:
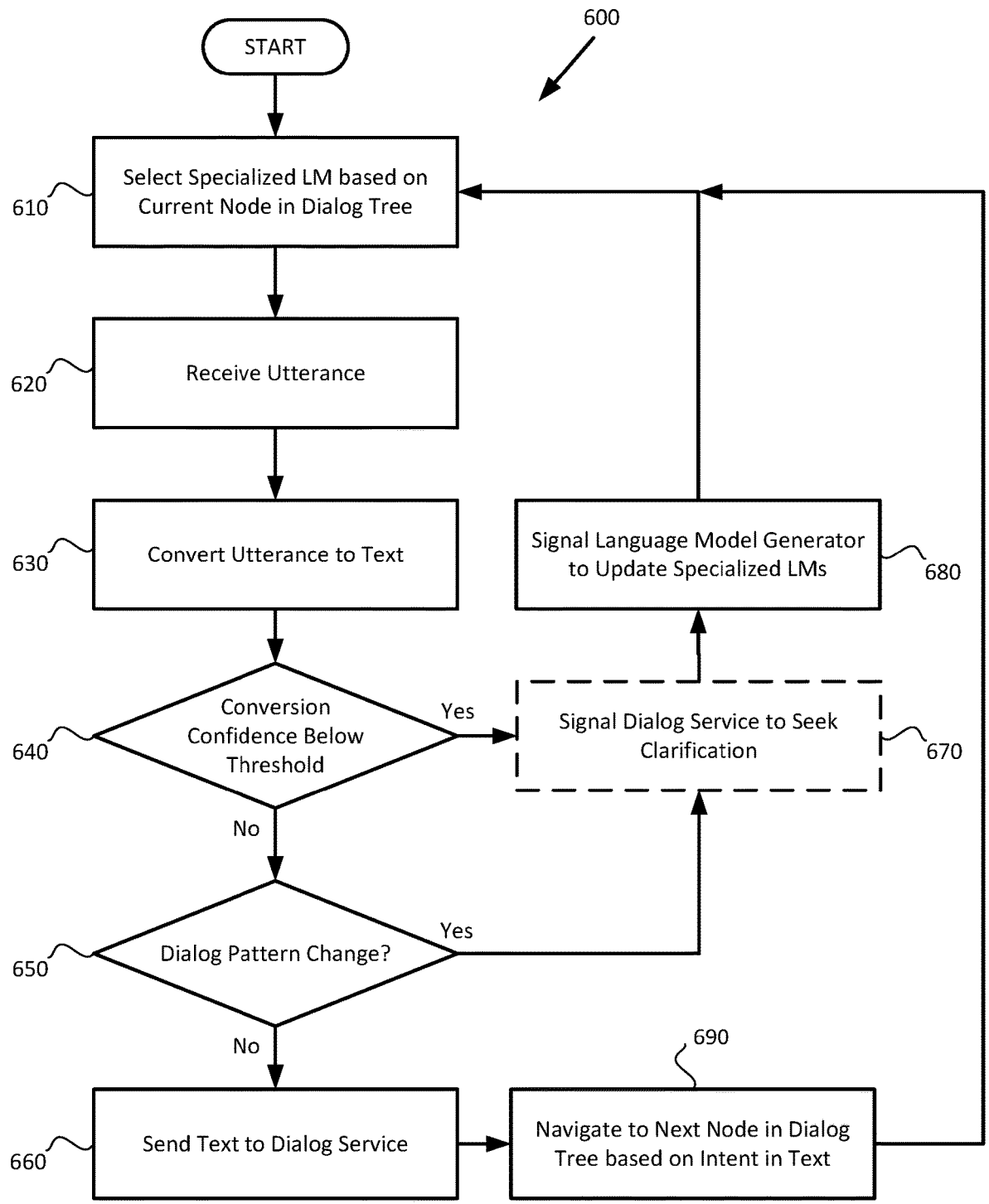
FIG. 6 is a flowchart of a method for navigating a dialog using specialized Language Models, according to embodiments of the present disclosure.

FIG. 6 is a flowchart of a method 600 for navigating a dialog using specialized LMs 232. Method 600 begins at block 610, where a navigation tracker 330 selects a specialized LM 232 from a plurality of specialized LMs 232 for a speech-to-text converter 234 to use when converting an utterance 310 into text 320. The navigation tracker 330 selects the specialized LM 232 for the speech-to-text converter 234 to use based on the user's current position in a dialog tree 211 that the user is navigating through. The navigation tracker 330 identifies which cluster 440 the user's current node in the dialog tree 211 belongs to, and selects the specialized LM 232 corresponding to that cluster 440. In embodiments in which the current node does not belong to a cluster 440, or the cluster 440 is not associated with a specialized LM 232, the navigation tracker 330 may select a generalized domain-specific LM 232 or a designated specialized LM 232 (e.g., a specialized LM 232 associated with an entry node 410 or an intermediate node 420 for operator assistance).

At block 620, the speech recognition service 230 receives an utterance 310 from a user. At block 630, the speech-to-text converter 234 converts the audio of the speech included in the utterance 310 into text 320 according to the word sequences of the specialized LM 232 selected at block 610. In various embodiments, the speech-to-text converter 234 may filter the text 320 to remove filler words (e.g., "ah", "um", "like"). The speech-to-text converter 234 converts the utterance 310 into text 320 using various trained machine learning models that associated phonemes (including periods of silence) with various words that are available in an LM 232. The machine learning model selects the word sequence with the highest confidence to matching the phonemes.

At block 640, a confidence tracker 340 determines whether the confidence in the selection of words from the selected specialized LM 232 is below a confidence threshold. In some embodiments, the confidence threshold is an immediate confidence threshold in the particular utterance 310 being converted to text 320. In other embodiments, the confidence threshold is a running confidence threshold in converting several utterances 310 at a particular node of the dialog tree 211 into text 320 over a period of time. When the conversion confidence is below the confidence threshold, method 600 proceeds to block 670. When the conversion confidence is at or above the confidence threshold, method 600 proceeds to block 650.

At block 650, the confidence tracker 340 determines whether a dialog pattern change has occurred in the utterance 310. For example, users may shift from navigating most frequently to a second node from a first node, to navigating most frequently to a third node from the first node. In another example, the speech-to-text converter 234 may identify with a high confidence that the user (or the dialog service 210 on behalf of the user) has navigated to an undesired node (e.g., via an utterance of "go back", "return to menu", "that is not what I meant"). When the confidence tracker 340 identifies a dialog pattern change at block 650, method 600 proceeds to block 670. When the confidence tracker 340 does not identify a dialog pattern change at block 650, method 600 proceeds to block 660.

At block 660, the speech recognition service 230 transmits the text 320 to the dialog service 210. On receipt of the text 320, at block 690, the dialog service 210 determines the intent of the user from the text 320, and navigates to a next node in the flow of the conversation with the user based on the determined intent from the text 320. Method 600 may conclude when the next node is the exit node 430, but otherwise may return to block 610 and continue navigation through the dialog tree 211. The dialog service 210 signals the navigation tracker 330 the identity of the next node, so that when method 600 returns to block 610, the navigation tracker 330 may select a different specialized LM 232 or the current specialized LM 232 for use in converting the next utterance 310 into text 320, based on what LM 232 is associated with the cluster 440 that the next node belongs to.

At block 670, when the conversion confidence is below the confidence threshold (per block 640), or the dialog pattern change indicates a change in navigation flows through the dialog tree 211 (per block 650), the confidence tracker 340 may optionally signal the dialog service 210 to seek clarification from the user. For example, when the text 320 includes one or more words with low confidence of conversion from speech, the dialog service 210 may advance to a clarification node in the dialog tree 211 to request the user to submit a new utterance 310 (e.g., "I am sorry, could you repeat that?", "Did you mean X or Y?").

At block 680, when the conversion confidence is below the confidence threshold (per block 640), or the dialog pattern change indicates a shift in navigation flows through the dialog tree (per block 650), the confidence tracker 340 signals the language model generator 220 to update the specialized LMs 232 and/or which nodes in the dialog tree 211 that are associated with a given specialized LM 232. In various embodiments, when signaled by the confidence tracker 340 to update the specialized LMs 232, the language model generator 220 performs method 500, as discussed in relation to FIG. 5.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the following, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, microcode, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications (e.g., NLP agents 180) or related data available in the cloud. For example, the NLP agent 180 could execute on a computing system in the cloud and generate and manage various specialized LMs 232 in converting speech to text. In such a case, the NLP agent 180 could convert speech to text in conjunction with navigating a dialog tree 211 and store LMs 232 at a storage location in the cloud. Doing so allows a user to access this information from any computing system attached to a network connected to the cloud (e.g., the Internet).

While the foregoing is directed to embodiments of the present invention, other and further embodiments of the invention may be devised without departing from the basic scope thereof, and the scope thereof is determined by the claims that follow.

What is claimed is:

1. A method comprising:

clustering a plurality of nodes comprising a dialog tree into at least a first cluster and a second cluster;

creating a first dataset of natural language sentences for the first cluster and a second dataset of natural language sentences for the second cluster;

generating a first specialized language model (LM) associated with the first cluster based on the first dataset;

generating a second specialized LM associated with the second cluster based on the second dataset, wherein the first specialized LM is different from the second specialized LM;

receiving a first utterance at first node in the dialog tree, wherein the first node belongs to the first cluster;

selecting, based on the first node belonging to the first cluster, the first LM to use to convert the first utterance into a first text;

determining a first intent from the first text as converted from the first utterance according to the first LM;

navigating to a second node in the dialog tree based on the first intent, wherein the second node belongs to the second cluster;

receiving a second utterance;

selecting, based on the second node belonging to the second cluster, the second LM to use to convert the second utterance into a second text;

determining a second intent from the second text as converted from the second utterance according to the second LM; and navigating to a third node in the dialog tree based on the second intent;

wherein converting the first utterance into text based on the first specialized LM comprises selecting vocabulary from the first specialized LM with a highest confidence score in matching the first utterance;

wherein converting the second utterance into text based on the second specialized LM comprises selecting vocabulary from the second specialized LM with a highest confidence score in matching the second utterance; and in response to at least one of the highest confidence score in matching the first utterance and the highest confidence score in matching the second utterance is below a confidence threshold, requesting at least one of a re-clustering of the nodes of the dialog tree and an update of the first specialized LM and the second specialized LM.

2. The method of claim 1, wherein the first specialized LM includes less vocabulary than a domain-specific LM for the dialog tree and the second specialized LM includes less vocabulary than the domain-specific LM, wherein the first specialized LM includes words excluded from the second specialized LM and the second specialized LM includes words excluded from the first specialized LM.

3. The method of claim 1, wherein clustering the plurality of nodes further comprises:
receiving sample sentences for each node of the plurality of nodes; and
grouping the nodes of the plurality of nodes based on shared vocabulary included in the sample sentences.

4. The method of claim 1, wherein clustering the plurality of nodes further comprises:
observing prior conversation flows through the dialog tree; and
grouping the nodes of the plurality of nodes based on a frequency of conversations flows including subsets of the plurality of nodes.

5. The method of claim 1, wherein navigating to the second node of the dialog tree includes transmitting a first natural language response to a user based on the second node; and
wherein navigating to the third node of the dialog tree includes transmitting a second natural language response based on the third node to the user.

6. The method of claim 1, further comprising:
receiving a third utterance;
converting the third utterance into a third text based on the second specialized LM; and
navigating to a fourth node of the dialog tree based on a third intent determined from the third text, wherein the fourth node belongs to the first cluster.

7. A system, comprising:
a navigation tracker, configured to identify a current node in a dialog tree and select a specialized language model (LM) associated with the current node;
a speech-to-text converter configured to receive utterances of natural language speech and convert the utterances into text based on the specialized LM selected for the current node; and a dialog service configured to navigate between the current node and a subsequent node in the dialog tree based on the text, wherein navigating to the subsequent node signals the navigation tracker to identity the subsequent node in the dialog tree and select a new specialized LM associated with the subsequent node for the speech-to-text converter to use when converting a subsequent utterance into text;

wherein a plurality of specialized LMs are stored for use in conjunction with the speech-to-text converter, wherein a number of specialized LMs stored corresponds to a number of clusters of nodes in the dialog tree; and wherein the clusters of nodes in the dialog tree group together nodes comprising the dialog tree based on historic conversational flows including nodes of a given cluster.

8. The system of claim 7, wherein the clusters of nodes in the dialog tree group together nodes comprising the dialog tree based on vocabulary shared in training sentences for nodes of a given cluster.

9. A computer readable storage medium including instructions that when performed by a processor enable the processor to perform an operation comprising:
clustering a plurality of nodes comprising a dialog tree into at least a first cluster and a second cluster;
creating a first dataset of natural language sentences for the first cluster and a second dataset of natural language sentences for the second cluster;
generating a first specialized language model (LM) associated with the first cluster based on the first dataset;
generating a second specialized LM associated with the second cluster based on the second dataset, wherein the first specialized LM is different from the second specialized LM;
receiving a first utterance at first node in the dialog tree, wherein the first node belongs to the first cluster;
selecting, based on the first node belonging to the first cluster, the first LM to use to convert the first utterance into a first text;
determining a first intent from the first text as converted from the first utterance according to the first LM;
navigating to a second node in the dialog tree based on the first intent, wherein the second node belongs to the second cluster;
receiving a second utterance;
selecting, based on the second node belonging to the second cluster, the second LM to use to convert the second utterance into a second text;
determining a second intent from the second text as converted from the second utterance according to the second LM;
navigating to a third node in the dialog tree based on the second intent; and
in response to identifying a change in a frequency of navigation through the dialog tree, requesting at least one of a re-clustering of the nodes of the dialog tree and an update of the first specialized LM and the second specialized LM.

10. The computer readable storage medium of claim 9, wherein the first specialized LM includes less vocabulary than a domain-specific LM for the dialog tree and the second specialized LM includes less vocabulary than the domain-specific LM, wherein the first specialized LM includes words excluded from the second specialized LM and the second specialized LM includes words excluded from the first specialized LM.

11. The computer readable storage medium of claim 9, wherein clustering the plurality of nodes further comprises:
   receiving sample sentences for each node of the plurality of nodes; and
   grouping the nodes of the plurality of nodes based on shared vocabulary included in the sample sentences.

12. The computer readable storage medium of claim 9, wherein clustering the plurality of nodes further comprises:
   observing prior conversation flows through the dialog tree; and
   grouping the nodes of the plurality of nodes based on a frequency of conversations flows including subsets of the plurality of nodes.

13. The computer readable storage medium of claim 9, further comprising:
   receiving a first utterance at first node in the dialog tree, wherein the first node belongs to the first cluster;
   selecting, based on the first node belonging to the first cluster, the first LM to use to convert the first utterance into a first text;
   determining a first intent from the first text as converted from the first utterance according to the first LM;
   navigating to a second node in the dialog tree based on the first intent, wherein the second node belongs to the second cluster;
   receiving a second utterance;
   selecting, based on the second node belonging to the second cluster, the second LM to use to convert the second utterance into a second text;
   determining a second intent from the second text as converted from the second utterance according to the second LM; and
   navigating to a third node in the dialog tree based on the second intent.

14. The computer readable storage medium of claim 13, wherein navigating to the second node of the dialog tree includes transmitting a first natural language response to a user based on the second node; and
   wherein navigating to the third node of the dialog tree includes transmitting a second natural language response based on the third node to the user.

15. The computer readable storage medium of claim 13, further comprising:
   receiving a third utterance;
   converting the third utterance into a third text based on the second specialized LM; and
   navigating to a fourth node of the dialog tree based on a third intent determined from the third text, wherein the fourth node belongs to the first cluster.

\* \* \* \* \*